US012118730B2

(12) United States Patent
Park et al.

(10) Patent No.: US 12,118,730 B2
(45) Date of Patent: Oct. 15, 2024

(54) DEVICE FOR DETECTING AN EDGE USING SEGMENTATION INFORMATION AND METHOD THEREOF

(71) Applicants: SK hynix Inc., Icheon (KR); Korea Advanced Institute of Science and Technology, Daejeon (KR)

(72) Inventors: Younghyun Park, Daejeon (KR); Jun Seo, Daejeon (KR); Jaekyun Moon, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 396 days.

(21) Appl. No.: 17/456,313

(22) Filed: Nov. 23, 2021

(65) Prior Publication Data
US 2022/0262006 A1 Aug. 18, 2022

(30) Foreign Application Priority Data

Feb. 15, 2021 (KR) .................. 10-2021-0020093

(51) Int. Cl.
*G06T 7/13* (2017.01)
*G06N 3/04* (2023.01)
*G06T 3/40* (2024.01)
*G06T 7/11* (2017.01)
*G06T 7/194* (2017.01)

(52) U.S. Cl.
CPC .............. *G06T 7/13* (2017.01); *G06N 3/04* (2013.01); *G06T 3/40* (2013.01); *G06T 7/11* (2017.01); *G06T 7/194* (2017.01); *G06T 2207/20081* (2013.01); *G06T 2207/20084* (2013.01)

(58) Field of Classification Search
CPC ... G06T 7/13; G06T 7/194; G06T 7/11; G06T 3/40; G06T 2207/20081; G06T 2207/20084; G06N 3/04
See application file for complete search history.

(56) References Cited

U.S. PATENT DOCUMENTS

| 10,410,353 | B2 | 9/2019 | Feng et al. |
| 10,482,603 | B1* | 11/2019 | Fu .............................. G06N 3/04 |
| 2018/0336683 | A1* | 11/2018 | Feng .......................... G06T 7/12 |
| 2022/0398737 | A1* | 12/2022 | Zhang ....................... G06T 5/50 |

(Continued)

OTHER PUBLICATIONS

H. H. Abbass et al., "Edge detection of medical images using Markov basis" Applied Mathematical Sciences 11(37), Jul. 2017, 1825-1833.

(Continued)

*Primary Examiner* — Pinalben Patel

(57) ABSTRACT

An edge detecting device includes a feature extracting circuit configured to extract first and second feature data from an input image; a prototype generating circuit configured to generate prototype data using the first feature data and an input label, the prototype data including foreground and background information of an object; a region detecting circuit configured to generate a segmentation mask by detecting a region of an object using the first feature data and the prototype data; and an edge extracting circuit configured to generate an edge map by combining the segmentation mask and the second feature data.

20 Claims, 7 Drawing Sheets

(56) References Cited

U.S. PATENT DOCUMENTS

2023/0096013 A1* 3/2023 Agrawal .................. G06T 7/62
345/423

OTHER PUBLICATIONS

D. Acuna et al., "Devil is in the Edges: Learning Semantic Boundaries from Noisy Annotations", In: Proceedings of the IEEE Conference on Computer Vision and Pattern Recognition., 2019, pp. 11075-11083.
P. Arbelaez et al., "Contour detection and hierarchical image segmentation", IEEE transactions on pattern analysis and machine intelligence 33(5), May 2011, pp. 898-916.
G. Bertasius et al., "Deepedge: A multi-scale bifurcated deep network for top-down contour detection", In: Proceedings of the IEEE conference on computer vision and pattern recognition., 2015, pp. 4380-4389.
G. Bertasius et al., "High-for-low and low-for-high: Efficient boundary detection from deep object features and its applications to high-level vision", In: Proceedings of the IEEE International Conference on Computer Vision., 2015, pp. 504-512.
G. Bertasius et al., "Semantic segmentation with boundary neural fields", In: Proceedings of the IEEE conference on computer vision and pattern recognition., 2016, pp. 3602-3610.
J. Canny, "A computational approach to edge detection", In IEEE Transactions on pattern analysis and machine Intelligence (6), Nov. 1986, pp. 679-698.
Liang-Chieh Chen et al., "Semantic image segmentation with task-specific edge detection using CNNs and a discriminatively trained domain transform", In: Proceedings of the IEEE conference on computer vision and pattern recognition.,2016, pp. 4545-4554.
Liang-Chieh Chen et al., "Deeplab: Semantic image segmentation with deep convolutional nets, atrous convolution, and fully connected CRFs", IEEE transactions on pattern analysis and machine intelligence 40(4), Apr. 2018, 834-848.
M. Cordts et al., "The cityscapes dataset for semantic urban scene understanding", In: Proceedings of the IEEE conference on computer vision and pattern recognition., 2016, pp. 3213-3223.
R. Deng et al., "Learning to predict crisp boundaries", In: Proceedings of the European Conference on Computer Vision (ECCV)., 2018, pp. 562-578.
N. Dong et al., "Few-shot semantic segmentation with prototype learning", In: BMVC., 2018, vol. 3.
M. Feng et al., "Attentive feedback network for boundary-aware salient object detection", In: Proceedings of the IEEE Conference on Computer Vision and Pattern Recognition., 2019, pp. 1623-1632.
V. Ferrari et al., "Groups of adjacent contour segments for object detection", IEEE transactions on pattern analysis and machine intelligence 30(1), Sep. 2006, pp. 36-51.
M. Fink, "Object classification from a single example utilizing class relevance metrics", In: Advances in neural Information processing systems., 2005, pp. 449-456.
C. Finn et al., "Model-agnostic meta-learning for fast adaptation of deep networks", In: Proceedings of the 34th International Conference on Machine Learning—vol. 70., 2017, pp. 1126-1135. JMLR. org.
K. Fu et al., "Meta-SSD: Towards fast adaptation for few-shot object detection with meta-learning", IEEE Access 7, Jun. 12, 2019, 77597-77606.
S. Gidaris et al., "Dynamic few-shot visual learning without forgetting", In: Proceedings of the IEEE Conference on Computer Vision and Pattern Recognition., 2018, pp. 4367-4375.
E.R. Hancock et al., "Edge-labeling using dictionary-based relaxation", IEEE Transactions on Pattern Analysis and Machine Intelligence 12(2), Feb. 1990, pp. 165-181.
B. Hariharan et al., "Semantic contours from inverse detectors", In: 2011 International Conference on Computer Vision., 2011, pp. 991-998. IEEE.
J. He et al., "Bi-directional cascade network for perceptual edge detection", In: Proceedings of the IEEE Conference on Computer Vision and Pattern Recognition., 2019, pp. 3828-3837.
R. Hou et al., "Cross attention network for few-shot classification", In: Advances in Neural Information Processing Systems., Oct. 2019, pp. 4005-4016.
Y. Hu et al, "Dynamic feature fusion for semantic edge detection", arXiv preprint arXiv:1902.09104, Feb. 2019.
J.J. Hwang et al., "Pixel-wise deep learning for contour detection", arXiv preprint arXiv:1504.01989, Apr. 2015.
P. Isola et al., "Image-to-image translation with conditional adversarial networks", In: Proceedings of the IEEE conference on computer vision and pattern recognition., 2017, pp. 1125-1134.
B. Kang et al., "Few-shot object detection via feature reweighting", In: Proceedings of the IEEE International Conference on Computer Vision., 2019, pp. 8420-8429.
L. Karlinsky et al., "RepMet: Representative-based metric learning for classification and few-shot object detection", In: Proceedings of the IEEE Conference on Computer Vision and Pattern Recognition., Nov. 2018, pp. 5197-5206.
D.P. Kingma et al., "ADAM: A method for stochastic optimization", arXiv preprint arXiv:1412.6980, 2015.
G. Koch, "Siamese neural networks for one-shot image recognition", In: ICML deep learning workshop., 2015, vol. 2. Lille.
S.M. Kye et al., "Meta-Learned Confidence for Few-shot Learning", arXiv:2002.12017v2, Jun. 24, 2020.
Y. Lifchitz et al., "Dense classification and implanting for few-shot learning", In: Proceedings of the IEEE Conference on Computer Vision and Pattern Recognition., 2019, pp. 9258-9267.
Y. Liu et al., "Learning to propagate labels: Transductive propagation network for few-shot learning", In: International Conference on Learning Representations, 2019.
Y. Liu et al., "Semantic edge detection with diverse deep supervision" arXiv preprint arXiv:1804.02864, 2018.
Y. Liu et al, "Richer convolutional features for edge detection", IEEE Transactions on Pattern Analysis and Machine Intelligence, vol. 41,No. 8, Aug. 2019.
I. Loshchilov et al., "Decoupled weight decay regularization", arXiv preprint arXiv:1711.05101, 2019.
J. Mehena, "Medical image edge detection using modified morphological edge detection approach", In International Journal of Computer Sciences and Engineering, Jun. 2019.
M. Prasad et al., "Learning class-specific edges for object detection and segmentation", In: Computer Vision, Graphics and Image Processing, 2006, pp. 94-105. Springer.
H. Qi et al., "Low-shot learning with imprinted weights", In: Proceedings of the IEEE conference on computer vision and pattern recognition., 2018, pp. 5822-5830.
K. Rakelly et al., "Conditional networks for few-shot semantic segmentation", In: International Conference on Learning Representations, 2018.
S. Ravi et al., "Optimization as a model for few-shot learning", In: International Conference on Learning Representations , 2017.
A. Santoro et al., "Meta-learning with memory-augmented neural networks", In: International conference on machine learning., 2016, pp. 1842-1850.
A. Shaban et al., "One-shot learning for semantic segmentation", arXiv preprint arXiv:1709.03410, 2017.
J. Snell et al., "Prototypical networks for few-shot learning", In: Advances in neural information processing systems., 2017, pp. 4077-4087.
K. Sugihara, "Machine interpretation of line drawings", The Massachusetts Institute of Technology Press, 1986.
F. Sung et al., "Learning to compare: Relation network for few-shot learning", In: Proceedings of the IEEE Conference on Computer Vision and Pattern Recognition., 2018, pp. 1199-1208.
S. Ullman et al., "Recognition by linear combination of models", Massachusetts Inst of Tech Cambridge Artificial Intelligence Lab, 1989.
O. Vinyals et al., "Matching networks for one shot learning" In: Advances in neural information processing systems., 2016, pp. 3630-3638.

(56) References Cited

OTHER PUBLICATIONS

K. Wang et al, "PANet: Few-shot image semantic segmentation with prototype alignment", In: Proceedings of the IEEE International Conference on Computer Vision., 2019, pp. 9197-9206.

T.C. Wang et al., "High-Resolution image synthesis and semantic manipulation with conditional GANs", In: Proceedings of the IEEE conference on computer vision and pattern recognition., 2018, pp. 8798-8807.

Xiang Li et al., "FSS-1000: A 1000-class dataset for few-shot segmentation", arXiv preprint arXiv:1907.12347, 2019.

S. Xie et al., "Holistically-nested edge detection", In: Proceedings of the IEEE international conference on computer vision., 2015, pp. 1395-1403.

S.W. Yoon et al., "TapNet: Neural network augmented with task-adaptive projection for few-shot learning", arXiv preprint arXiv:1905.06549, 2019.

J. Yosinski et al, "Understanding neural networks through deep visualization", arXiv preprint arXiv:1506.06579, Jun. 2015.

Z. Yu et al., "CASENet: Deep category-aware semantic edge detection", In: Proceedings of the IEEE Conference on Computer Vision and Pattern Recognition., 2017, pp. 5964-5973.

Z. Yu et al, "Generalized transitive distance with minimum spanning random forest", In: IJCAI., 2015, pp. 2205-2211. Citeseer.

Z. Yu et al, "Simultaneous edge alignment and learning", In: Proceedings of the European Conference on Computer Vision (ECCV)., 2018, pp. 388-404.

C. Zhang et al, "CA Net: Class-agnostic segmentation networks with iterative refinement and attentive few-shot learning", In: Proceedings of the IEEE Conference on Computer Vision and Pattern Recognition., 2019, pp. 5217-5226.

X. Zhang et al, "SG-One: Similarity guidance network for one-shot semantic segmentation", IEEE Transactions on Cybernetics, May 2020.

D. Zhu et al., "Semantic edge based disparity estimation using adaptive dynamic programming for binocular sensors", Sensors 18, 2018, 1074; doi:10.3390/ s18041074.

\* cited by examiner

DEVICE FOR DETECTING AN EDGE USING SEGMENTATION INFORMATION AND METHOD THEREOF

CROSS-REFERENCE TO RELATED APPLICATION

The present application claims priority under 35 U.S.C. § 119(a) to Korean Patent Application No. 10-2021-0020093, filed on Feb. 15, 2021, which is incorporated herein by reference in its entirety.

BACKGROUND

1. Technical Field

Various embodiments generally relate to a device for detecting an edge using segmentation information and a method thereof.

2. Related Art

Technology for detecting an edge of an object in an image can be used for various purposes, such as object reconstruction, image generation, and medical image processing.

Recently, the performance of edge detection is being improved by applying neural network technology.

However, in the related art, there is a problem that a large amount of data is required for training a neural network.

Accordingly, there is a need for a technique for improving edge detection performance even when a neural network is trained using a small amount of training data.

SUMMARY

In accordance with an embodiment of the present disclosure, an edge detecting device may include a feature extracting circuit configured to extract first feature data and second feature data from an input image; a prototype generating circuit configured to generate, using the first feature data and an input label, prototype data including foreground information of an object and background information of the object; a region detecting circuit configured to generate a segmentation mask by detecting a region of an object using the first feature data and the prototype data; and an edge extracting circuit configured to generate an edge map by combining the segmentation mask and the second feature data.

In accordance with an embodiment of the present disclosure, an edge detecting method may include generating first feature data and second feature data by encoding an input image; generating prototype data including a foreground information of an object and background information of the object by using the first feature data and an input label; generating a segmentation mask by detecting a region of an object by using the first feature data and the prototype data; and generating an edge map by combining the segmentation mask and the second feature data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s). Furthermore, a circuit, as the term is used herein, may include a neuromorphic circuit, a central processing unit (CPU) executing software, a graphics processing unit (GPU) executing software, a vision processing unit (VPU) executing software, a tensor processing unit (TPU) executing software, a field-programmable gate array, an application-specific integrated circuit (ASIC), and combinations thereof, although embodiments are not limited thereto. Also, in embodiments, a plurality of circuits may be implemented by respective software running on a same CPU, GPU, VPU, TPU, or the like.

Figure 1:
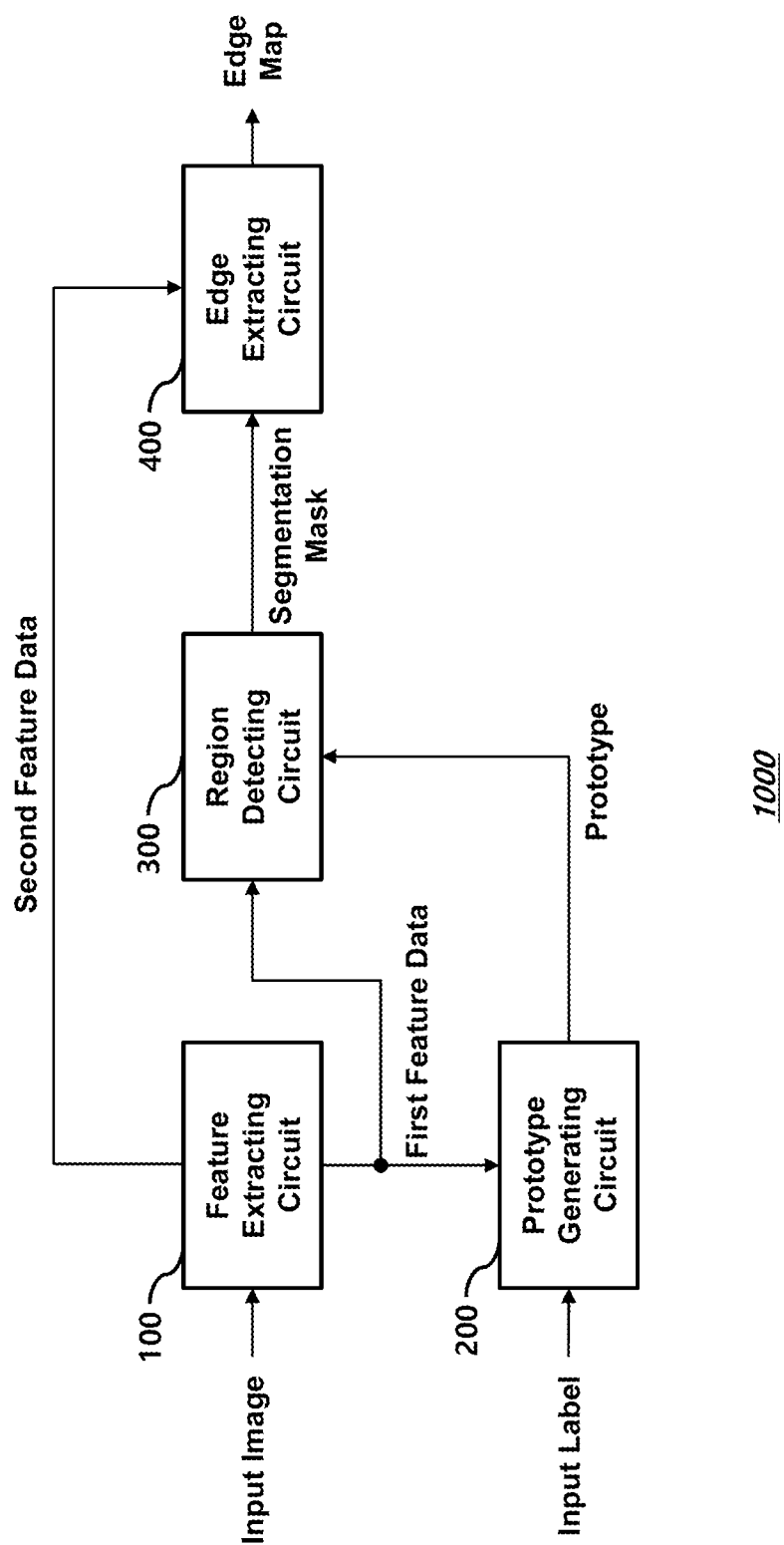
FIG. 1 illustrates an edge detecting device according to an embodiment of the present disclosure.

FIG. 1 is a block diagram illustrating an edge detecting device 1000 according to an embodiment of the present disclosure.

Hereinafter, the configuration of the edge detecting device 1000 will be described focusing on an inference operation, and a training operation thereof will be disclosed in detail below.

The edge detecting device 1000 includes a feature extracting circuit 100, a prototype generating circuit 200, a region detecting circuit 300, and an edge extracting circuit 400.

The feature extracting circuit 100 extracts feature data from an input image.

Hereinafter, the input image refers to an image input to the feature extracting circuit 100 during an inference operation.

The feature data includes first feature data provided to the prototype generating circuit 200 and second feature data provided to the edge extracting circuit 400.

The feature extracting circuit 100 may generate feature data in a manner that increases dimensions of each pixel while decreasing a size of the input image.

The prototype generating circuit 200 generates prototype data by combining the first feature data or a part thereof with an input label.

The input label is an image including foreground information and background information of an object corresponding to the input image, and may be expressed as, for example, a bitmap image.

The prototype data includes foreground prototype data and background prototype data.

The region detecting circuit 300 generates a segmentation mask by using the first feature data and the prototype data.

The segmentation mask indicates an area where an object whose edge is to be extracted is located in the input image.

The edge extracting circuit 400 generates an edge map using the second feature data and the segmentation mask.

The edge extracting circuit 400 generates the edge map by concentrating on an area where the segmentation mask indicates an object is located during the process of extracting the edge.

Figure 2:
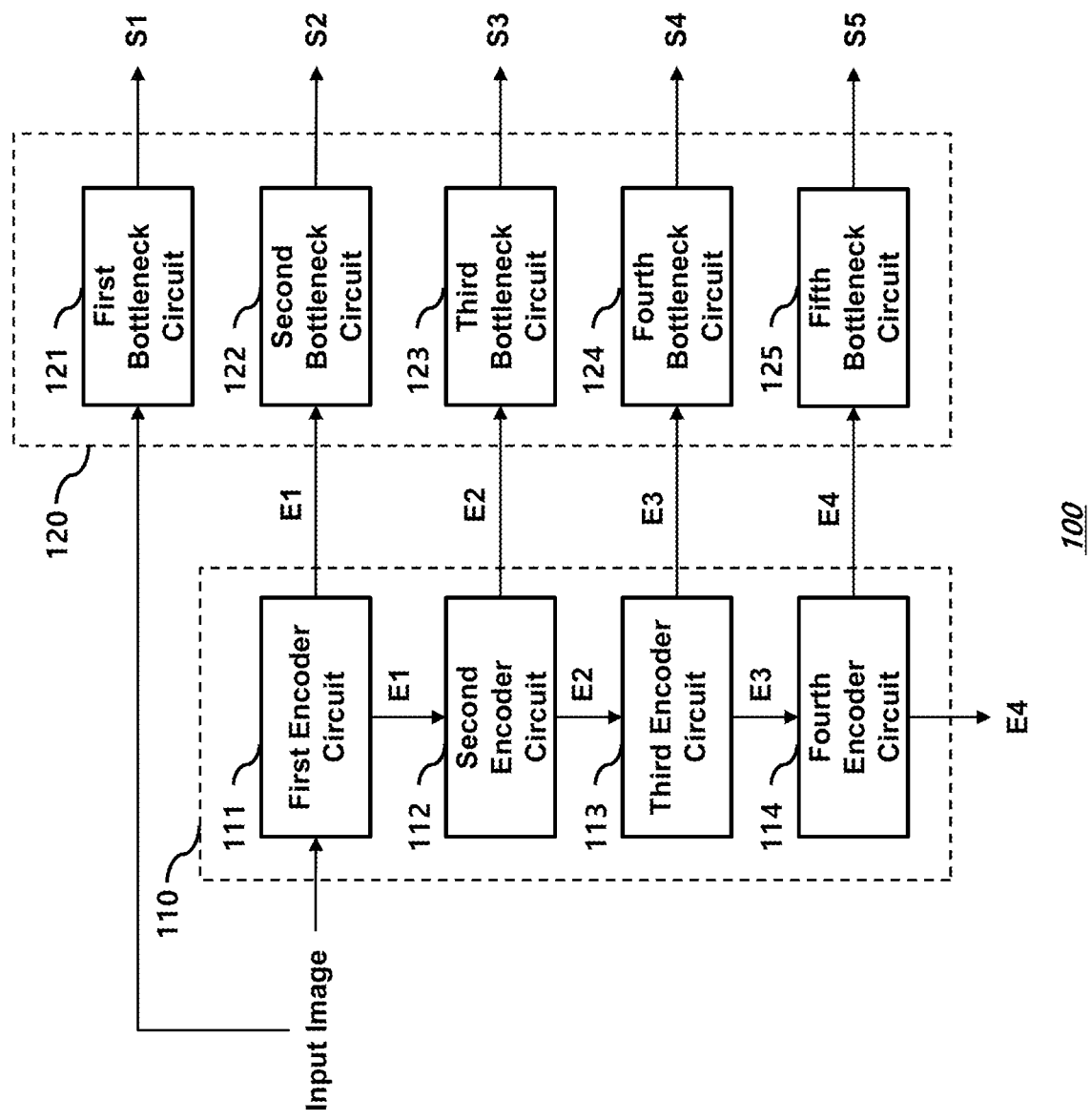
FIG. 2 illustrates a feature extracting circuit according to an embodiment of the present disclosure.

FIG. 2 is a block diagram illustrating a feature extracting circuit 100 according to an embodiment of the present disclosure.

The feature extracting circuit 100 includes a first feature extracting circuit 110.

The first feature extracting circuit 110 may include a neural network circuit trained in advance using an image database such as ImageNet.

The first feature extracting circuit 110 may include a plurality of encoder circuits 111 to 114. Each of the encoder circuits 111 to 114 may include a respective neural network circuit. The encoder circuits 111 to 114 may be connected successively to form a hierarchical structure.

The plurality of encoder circuits 111 to 114 generate feature data corresponding to the input image while sequentially decreasing the size of the input image at a predetermined ratio and sequentially increasing a dimension of data corresponding to each pixel.

In the present embodiment, each of the plurality of encoder circuits reduces a size of a respective image by ½ in width and length, respectively.

For example, assuming that the size of the input image is 320×320, the size of the first encoded data E1 output from the first encoder circuit 111 is 160×160, the size of the first encoded data E2 output from the second encoder circuit 112 is 80×80, the size of the third encoded data E3 output from the third encoder circuit 113 is 40×40, and the size of the fourth encoded data E4 output from the fourth encoder circuit 114 is 20×20.

In the first to fourth encoded data E1 to E4, the number of horizontal and vertical pixels decreases, but a number of dimension corresponding to each pixel increases in reverse proportion.

For example, when one pixel of the 320×320 input image has one dimension, one pixel of the 160×160 first encoded data E1 has 4 dimensions, one pixel of the 80×80 second encoded data E2 has 16 dimensions, one pixel of the 40×40 third encoded data E3 has 64 dimensions, and one pixel of the 20×20 fourth encoded data E4 has 256 dimensions.

The number of encoder circuits may be increased or decreased according to embodiments.

The feature extracting circuit 100 further includes a second feature extracting circuit 120.

The second feature extracting circuit 120 may include a pre-trained neural network circuit.

In the present embodiment, the second feature extracting circuit 120 may include a plurality of bottleneck circuits 121 to 125. Each of the bottleneck circuits 121 to 125 may include a respective neural network circuit.

The plurality of bottleneck circuits 121 to 125 generate bottleneck data by transforming the input image and encoded data so that they are suitable for edge extraction.

In the embodiment of FIG. 2, the size of the bottleneck data produced by each of the bottleneck circuits 121 to 125 may be the same as the size of the input image or encoded data input to that bottleneck circuit.

The first bottleneck circuit 121 converts the input image to generate the first bottleneck data S1, and the second bottleneck circuit 122 converts the first encoded data E1 to generate the second bottleneck data S2, the third bottleneck circuit 123 converts the second encoded data E2 to generate the third bottleneck data S3, the fourth bottleneck circuit 124 converts the third encoded data E3 to generate the fourth bottleneck data S4, and the fifth bottleneck circuit 125 converts the fourth encoded data E4 to generate the fifth bottleneck data S5.

In this embodiment, the first feature data includes first to fourth encoded data E1 to E4, and the second feature data includes first to fifth bottleneck data S1 to S5.

Figure 3:
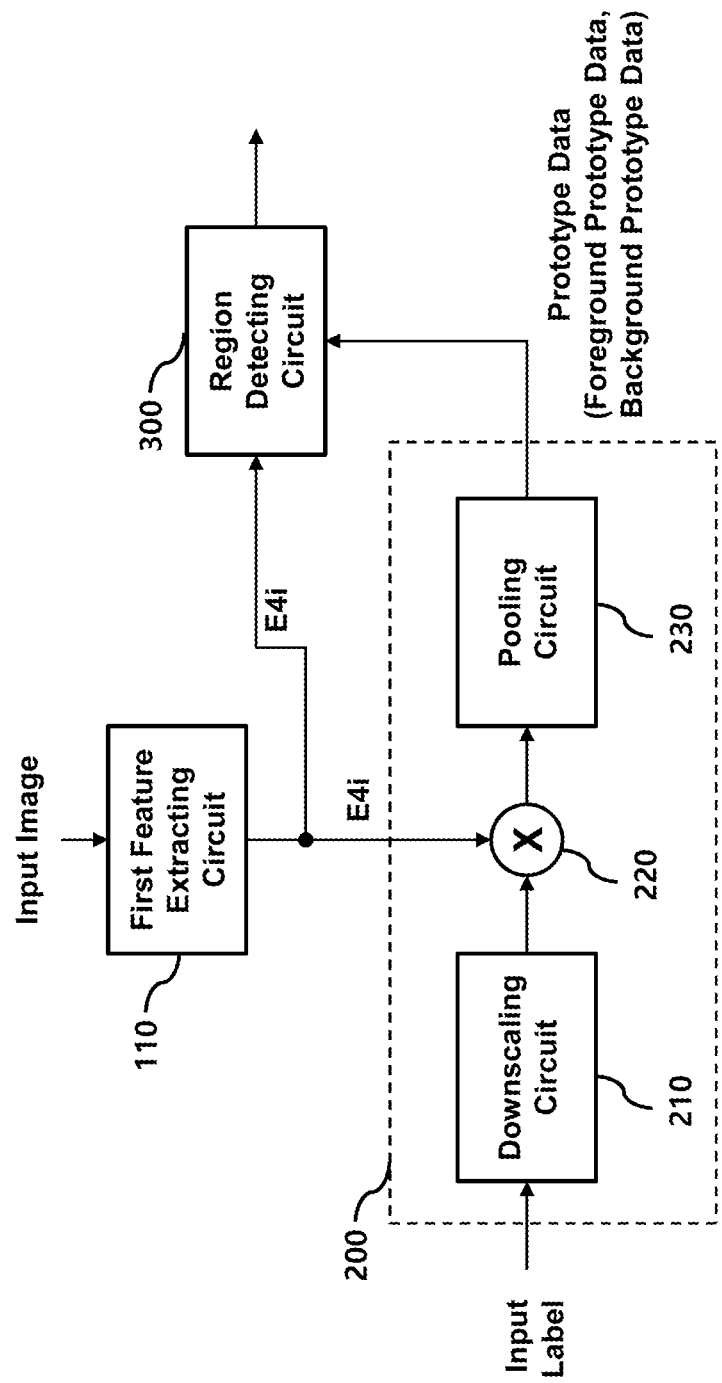
FIG. 3 illustrates a prototype generating circuit according to an embodiment of the present disclosure.

FIG. 3 is a block diagram illustrating a prototype generating circuit 200 according to an embodiment of the present disclosure.

The prototype generating circuit 200 generates a prototype data using an input label corresponding to the input image and the first feature data generated when the input image is provided to the first feature extracting circuit 110 during an inference process.

As described above, the input label is an image including foreground information and background information of an object corresponding to the input image.

In this embodiment, the first feature data provided to the prototype generating circuit 200 is the fourth encoded data E4 of FIG. 2.

Hereinafter, the fourth encoded data corresponding to the input image is denoted by E4*i*.

The prototype generating circuit 200 includes a downscaling circuit 210, a masking circuit 220, and a pooling circuit 230.

The downscaling circuit 210 reduces the size of the input label to fit the size of the fourth encoded data E4*i* and adjusts the number of dimensions occupied by each pixel to match the number of dimensions of the fourth encoded data E4*i*.

For example, if the size of the fourth encoded data E4*i* is 20×20 and the number of dimensions is 256, the downscaling circuit 210 adjusts the size of the input label to 20×20 and the number of dimensions to 256.

The masking circuit 220 masks the fourth encoded data E4*i* using the input label.

For example, the masking circuit 220 outputs a result by performing a dimension-wise multiplication operation for pixels of the fourth encoded data E4*i* and the input label at the same position.

The pooling circuit 230 generates foreground prototype data and background prototype data from an operation result of the masking circuit 220.

Each of the foreground prototype data and the background prototype data is vector data having a same number of dimensions as the data output from the masking circuit 220.

The value of each dimension in the prototype data can be determined through an average pooling technique.

For example, the foreground prototype data may be obtained by averaging data corresponding to a foreground of an object where the object is located per each dimension, and the background prototype data may be data obtained by averaging data corresponding to a background of the object where the object is not located per each dimension.

During an inference process, one foreground prototype data and one background prototype data may be generated regardless of the number of dimensions of data output from the masking circuit 220.

During a training process, in order to calculate a loss function of the region detecting circuit 300, when the dimension of data output from the masking circuit 220 is n×N, where n and N are natural numbers, one foreground prototype data and one background prototype data are generated for every N dimensions. Thus, a total of n foreground prototype data and n background prototype data can be created. The training process will be disclosed in detail below.

In FIG. 3, the region detecting circuit 300 generates a segmentation mask by using the prototype data and the fourth encoder data E4$i$ corresponding to the input image.

The segmentation mask corresponds to data indicating a region where an object whose edge will be detected is located, and may be determined by using the fourth encoded data E4$i$, the foreground prototype data, and the background prototype data.

For example, the region detecting circuit 300 may determine whether a pixel belongs to a foreground or a background by comparing a distance between a pixel data of the fourth encoded data E4$i$ and the foreground prototype data and a distance between the pixel data of the fourth encoded data E4$i$ and the background prototype data.

Figure 4:
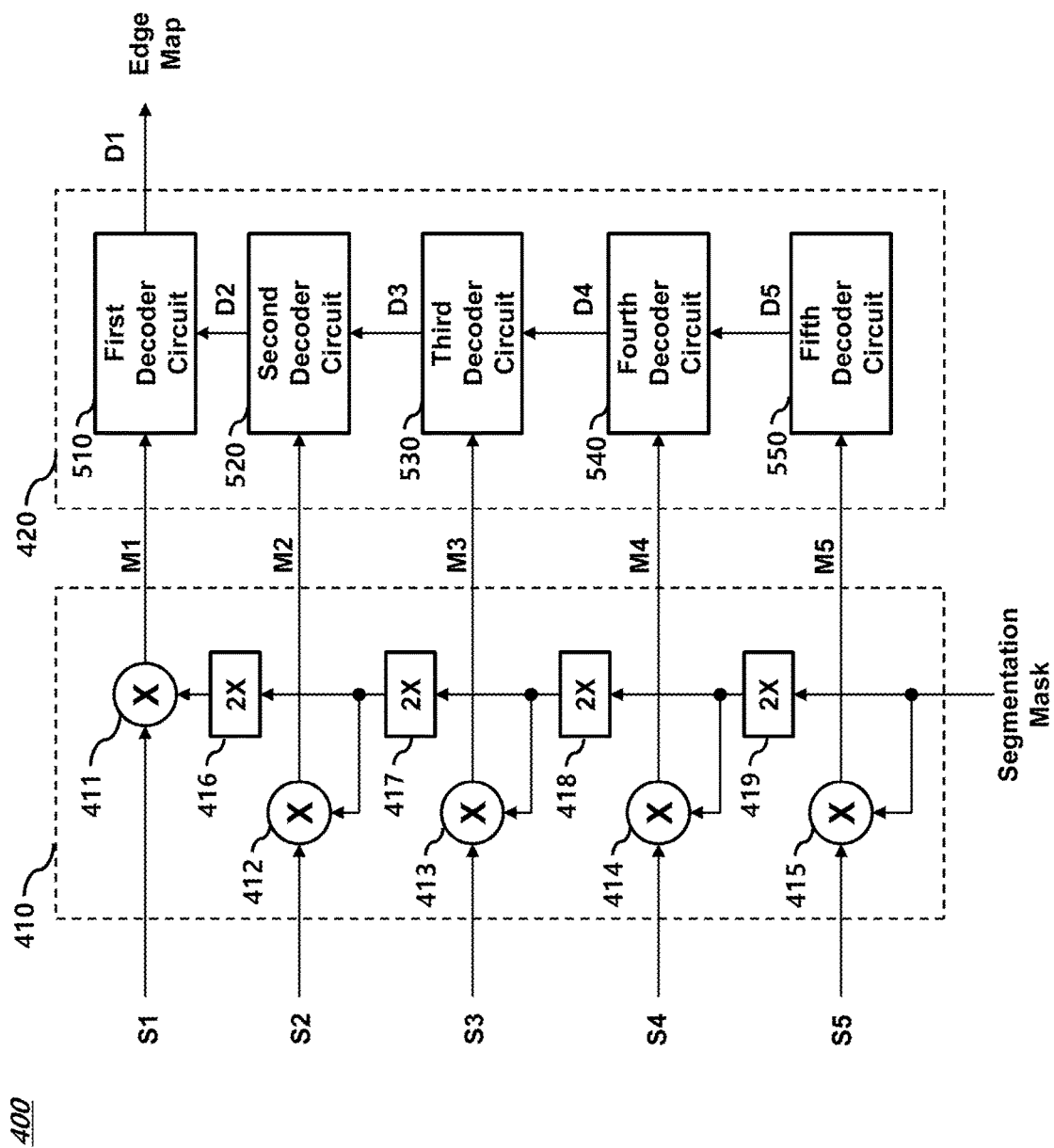
FIG. 4 illustrates an edge detecting circuit according to an embodiment of the present disclosure.

FIG. 4 is a block diagram illustrating an edge extracting circuit 400 according to an embodiment of the present disclosure.

The edge extracting circuit 400 includes a signal synthesizing circuit 410 and an edge generating circuit 420.

The signal synthesizing circuit 410 synthesizes the second feature data and the segmentation mask provided by the region detecting circuit 300 to produce masking data used in the edge extracting process.

Specifically, the signal synthesizing circuit 410 generates a plurality of masking data M1 to M5 by masking a plurality of bottleneck data S1 to S5 using the segmentation mask.

As described above, the first to fifth bottleneck data S1 to S5 are multi-scale feature data each having a different scale.

As shown in FIG. 4, since the segmentation mask has the smallest scale, the size of the segmentation mask is sequentially increased and used to mask corresponding bottleneck data.

To this end, the signal synthesizing circuit 410 includes a plurality of masking circuits 411 to 415 and a plurality of upscaling circuits 416 to 419.

For example, the masking circuit 411 performs an operation on the first bottleneck data S1 and an output of the upscaling circuit 416 to output the first masking data M1.

The output of the upscaling circuit 416 corresponds to a signal in which the size of the segmentation mask is upscaled 4 times (in the present example, for a total upsizing of 16× horizontal and 16× vertical) to match the size of the first bottleneck data S1.

The masking circuit 412 performs an operation on the second bottleneck data S2 and an output of the upscaling circuit 417 to output the second masking data M2.

The output of the upscaling circuit 417 corresponds to a signal in which the size of the segmentation mask is upscaled three times (in the present example, for a total upsizing of 8× horizontal and 8× vertical) to match the size of the second bottleneck data S2.

The masking circuit 413 performs an operation on the third bottleneck data S3 and an output of the upscaling circuit 418 to output the third masking data M3.

The output of the upscaling circuit 418 corresponds to a signal in which the size of the segmentation mask is upscaled twice (in the present example, for a total upsizing of 4× horizontal and 4× vertical) to match the size of the third bottleneck data S3.

The masking circuit 414 performs an operation on the fourth bottleneck data S4 and an output of the upscaling circuit 419 to output the fourth masking data M4.

The output of the upscaling circuit 419 corresponds to a signal in which the size of the segmentation mask is upscaled once (in the present example, for a total upsizing of 2× horizontal and 2× vertical) to match the size of the fourth bottleneck data S4.

The masking circuit 415 performs an operation on the fifth bottleneck data S5 and the segmentation mask to output the fifth masking data M5.

Since the operation of the masking circuit is the same as described above, repeated description thereof will be omitted.

The edge generating circuit 420 generates an edge map D1 by using a plurality of multi-scale masking data M1 to M5.

The edge generating circuit 420 may include, for example, a neural network such as a Convolutional Neural Network (CNN).

The edge generating circuit 420 includes a plurality of decoder circuits, and in this embodiment includes first to fifth decoder circuits 510 to 550.

In the present embodiment, the edge generating circuit 420 sequentially decodes multi-scale masking data to generate the edge map D1.

To this end, each of the first to fourth decoder circuits 510 to 540 perform a neural network operation using a corresponding masking data and a decoding result from another decoder circuit.

For example, the first decoder circuit 510 concatenates the first masking data M1 with data obtained by upscaling an output D2 of the second decoder circuit 520 and performs a convolution operation using a result of the concatenation.

The operations of the second to fourth decoder circuits 520 to 540 are similar thereto.

However, the fifth decoder circuit 550 performs a convolution operation using only the fifth masking data M5 and outputs a result thereof.

Figure 5:
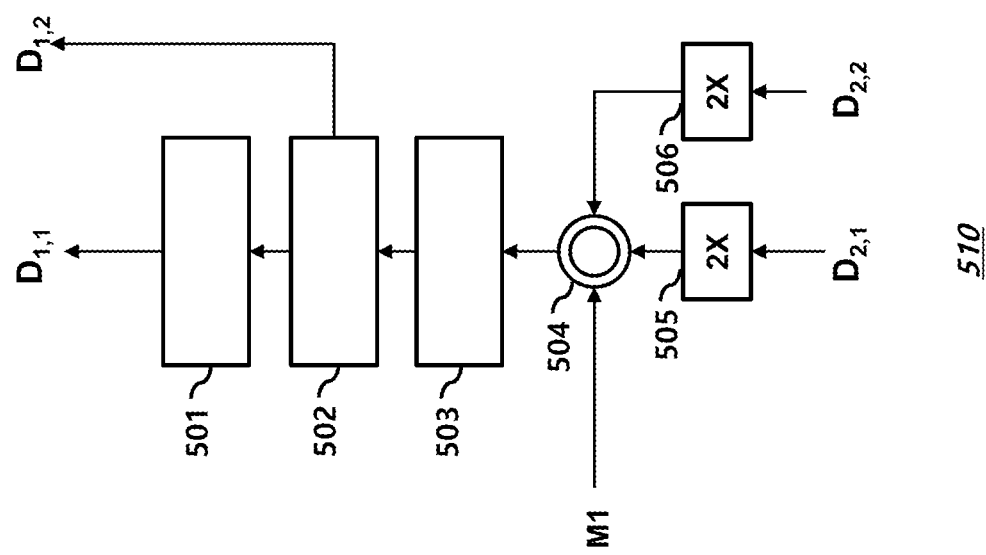
FIG. 5 illustrates a decoder circuit according to an embodiment of the present disclosure.

FIG. 5 is a block diagram illustrating the first decoder circuit 510.

In this embodiment, the first decoder circuit 510 includes sequentially connected first to third convolution circuits 501, 502, and 503, a concatenation operation circuit 504, and upscaling circuits 505 and 506.

The first convolution circuit 501 outputs a 1-1st decoder data $D_{1,1}$ by performing a convolution operation on the output of the second convolution circuit 502, and the second convolution circuit 502 performs a convolution operation on the output of the third convolution circuit 503 to output a 1-2nd decoder data $D_{1,2}$, and the third convolution circuit 503 performs a convolution operation on the output of the concatenation operation circuit 504. An output D1 of first decoder circuit 510 (as shown in FIG. 4) may correspond to the 1-1st decoder data $D_{1,1}$.

The concatenation operation circuit 504 concatenates an output of the first masking data M1 and outputs of the upscaling circuits 505 and 506.

Concatenation operations may increase the number of dimensions. For example, when the size and dimension of the first masking data M1 are 320×320 and 20, and the size and dimension of the output of each of the upscaling circuits 505 and 506 are 320×320 and 10, an output of the concatenation operation circuit 504 has the size and dimensions of 320×320 and 40.

The upscaling circuit 505 upscales the 2-1st decoder data $D_{2,1}$, and the upscaling circuit 506 upscales the 2-2nd decoder data $D_{2,2}$. In the present example, the upscaling circuit 505 and the upscaling circuit 506 each upsize by 2× horizontal and 2× vertical.

Since the second to fifth decoder circuits 520 to 550 have substantially the same configuration as the first decoder circuit 510, a detailed description thereof will be omitted.

Figure 6:
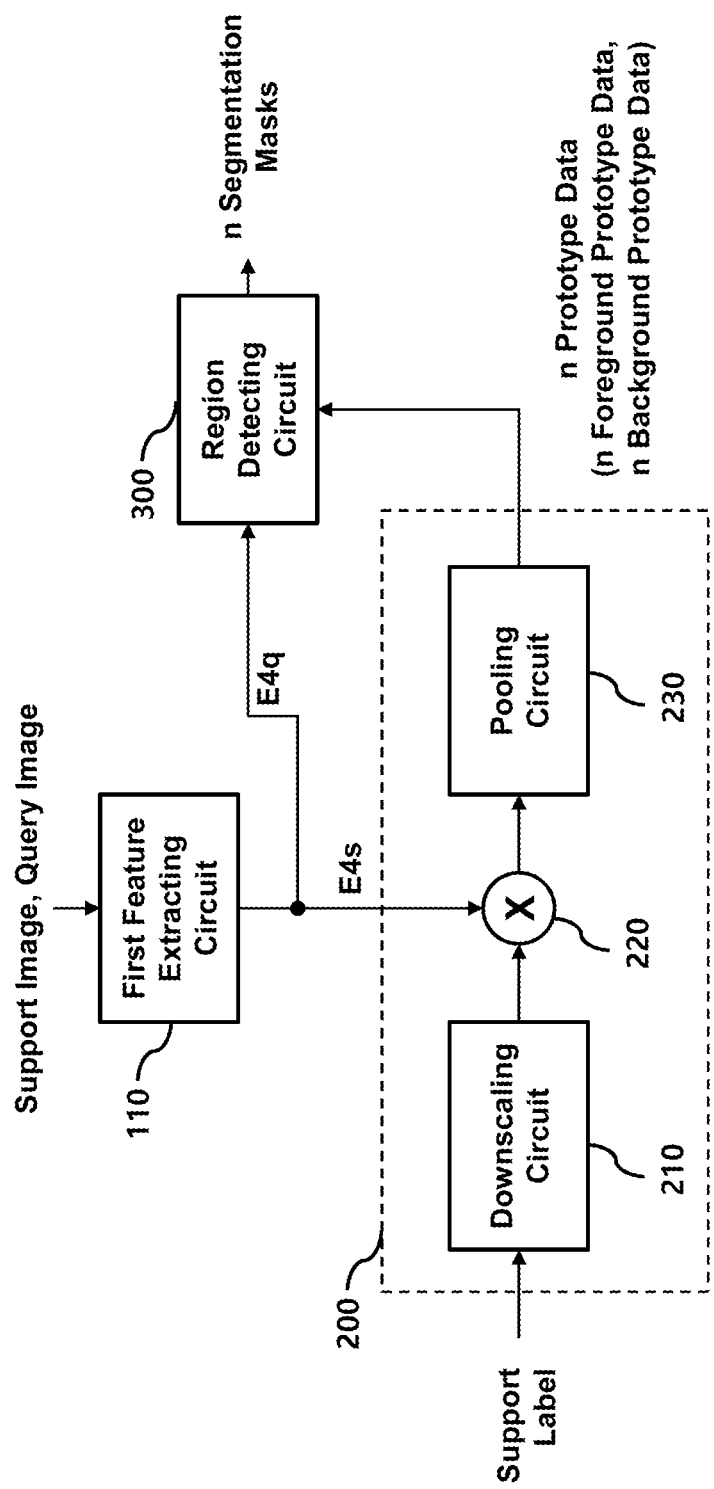
FIG. 6 illustrates a training operation of a prototype generating circuit and a region detecting circuit according to an embodiment of the present disclosure.
Figure 7:
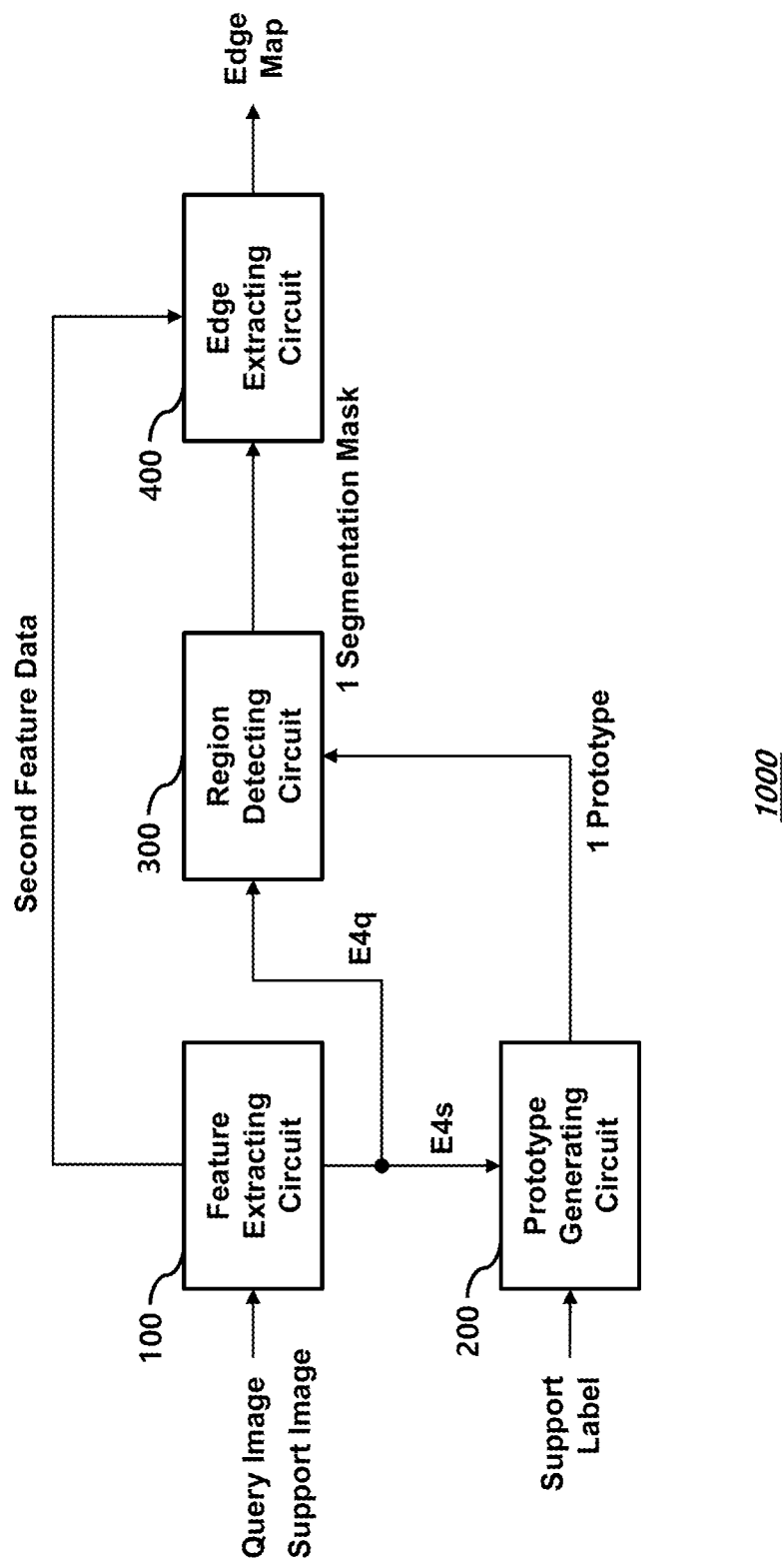
FIG. 7 illustrates a prototype generating circuit and a training operation thereof according to an embodiment of the present disclosure.

FIGS. 6 and 7 are block diagrams illustrating a training operation of the edge detecting device 1000 according to an embodiment of the present disclosure.

The data set used for training the edge detecting device 1000 includes a support image, a support label, a query image, and a query label.

For example, there may be 800 object classes (sometimes referred to as types) included in the data set, and each class may include 5 support images and 5 query images.

Since support labels and query labels including respective foreground and background information for the support images and the query images are included in the data set, total number of support labels and query labels may be 8,000.

In the training process, the support images, support labels, query images, and query labels are used.

Each training stage may be performed based on one class, and the next training stage may be performed based on another class.

FIG. 6 illustrates an operation of calculating a loss function of the region detecting circuit 300 in a training process.

The first feature extracting circuit 110 generates a fourth encoded data corresponding to the query image and a fourth encoded data corresponding to the support image.

Hereinafter, the fourth encoded data corresponding to the query image may be represented as a query feature data E4$q$ and the fourth encoded data corresponding to the support image may be represented as a support feature data E4$s$.

The support feature data E4$s$ corresponding to the support image and the support label are applied to the prototype generating circuit 200.

As described above, when the dimensions of the data output from the masking circuit 220 is n×N in the training process, the prototype generating circuit 200 generates one foreground prototype data and one background prototype data for each N dimensions, and generates a total of n prototype data (each including foreground prototype data and background prototype data), where n and N are natural numbers.

To this end, the pooling circuit 230 generates a pair of prototype data for each N dimensions. That is, n foreground prototype data and n background prototype data are generated.

In each training step, prototype data is determined using one or more support images and corresponding support labels corresponding to a selected class.

When two or more support images and corresponding support labels are used, a plurality of n pairs of prototype data may be generated corresponding to the used support images.

In this case, n pairs of prototype data may be finally generated by averaging a plurality of n pairs of prototype data for each dimension.

In the training process, the query feature data E4$q$ is applied to the region detecting circuit 300.

The region detecting circuit 300 generates n segmentation masks using n pairs of prototype data and the query feature data E4$q$.

That is, the region detecting circuit 300 generates one of the n segmentation masks using one prototype data among the n pairs of prototype data and the query feature data E4$q$.

A region detecting loss function Lseg can be calculated by comparing n segmentation masks and a query label corresponding to the query image used to generate the query feature data E4$q$.

For the region detecting loss function Lseg, for example, a mean-squared error may be calculated for each of the query label and the n segmentation masks.

In each training step, one or more query images included in the data set can be used.

If two or more query images are used, a plurality of region detecting loss functions corresponding to the one or more query images are calculated, and an average thereof can be defined as the region detecting loss function Lseg.

FIG. 7 is a block diagram illustrating a training process of the edge detecting device 1000.

In the training process of the edge detecting device 1000, the prototype generating circuit 200 generates one prototype data using support feature data E4$s$ and support labels corresponding to one or more support images, similar to the inference process.

Also, the region detecting circuit 300 generates one segmentation mask by using the prototype data and the query feature data E4$q$ corresponding to the query image.

The edge extracting circuit 400 generates an edge map using one segmentation mask and a second feature data corresponding to a query image.

For a training operation, an edge loss function is calculated by comparing the edge map extracted by the edge extracting circuit 400 with the actual edge map corresponding to the query image.

The edge loss function Ledge can be calculated using conventional techniques.

For example, the edge loss function Ledge can be calculated as the sum of the cross-entropy loss function Lce and the dice loss function Ldice, which is disclosed in the article ⌈Deng, R., Shen, C., Liu, S., Wang, H., Liu, X.: *Learning to predict crisp boundaries.* In: *Proceedings of the European Conference on Computer Vision (ECCV).* pp. 562?578 (2018)⌋.

If two or more query images are used, multiple edge loss functions corresponding to respective query images are calculated, and an average thereof can be defined as the edge loss function Ledge.

In this embodiment, the sum of the region detecting loss function Lseg and the edge loss function Ledge is determined as the total loss function.

In each training step, neural network coefficients included in the feature extracting circuit 100, the region detecting circuit 300, and the edge extracting circuit 400 may be adjusted in a direction to minimize the value of the total loss function.

For example, the neural network coefficients included in the second feature extracting circuit 120 and the region detecting circuit 300 of FIG. 2, and the edge generating circuit 420 of FIG. 4 may be adjusted.

After that, the training step can be repeated by selecting a new class included in the data set.

Although various embodiments have been illustrated and described, various changes and modifications may be made to the described embodiments without departing from the spirit and scope of the invention as defined by the following claims.

What is claimed is:

1. An edge detecting device comprising:
   a feature extracting circuit configured to extract first feature data and second feature data from an input image;
   a prototype generating circuit configured to generate, using the first feature data and an input label, prototype data including foreground information of an object and background information of the object;
   a region detecting circuit configured to generate a segmentation mask by detecting a region of the object using the first feature data and the prototype data; and
   an edge extracting circuit configured to generate an edge map by combining the segmentation mask and the second feature data.

2. The edge detecting device of claim 1, wherein the feature extracting circuit includes:
   a first feature extracting circuit configured to extract the first feature data from the input image; and
   a second feature extracting circuit configured to extract the second feature data from the first feature data and the input image.

3. The edge detecting device of claim 2,
   wherein the first feature extracting circuit includes a plurality of encoder circuits configured to generate a plurality of encoded data corresponding to the first feature data by sequentially changing a size of the input image, and
   wherein the second feature extracting circuit includes a plurality of bottleneck circuits configured to generate multi-level bottleneck data corresponding to the second feature data by performing an operation on the input image and the plurality of encoded data.

4. The edge detecting device of claim 1, wherein the prototype generating circuit includes:
   a masking circuit configured to mask the first feature data using the input label; and
   a pooling circuit configured to generate foreground prototype data corresponding to the foreground information and background prototype data corresponding to the background information from an output of the masking circuit.

5. The edge detecting device of claim 4, wherein the prototype generating circuit further includes a downscaling circuit configured to decrease a size of the input label to that of the first feature data.

6. The edge detecting device of claim 1, wherein the region detecting circuit generates the segmentation mask by comparing a distance between a pixel of the first feature data and a vector representing the background information and a distance between a pixel of the second feature data and a vector representing the foreground information.

7. The edge detecting device of claim 1, wherein the edge extracting circuit includes:
   a signal synthesizing circuit configured to output masking data by masking the second feature data using the segmentation mask; and
   an edge generating circuit configured to generate the edge map by decoding the masking data.

8. The edge detecting device of claim 7, wherein the second feature data includes a plurality of bottleneck data having different sizes, and the signal synthesizing circuit includes a plurality of upscaling circuit configured to sequentially increase a size of the segmentation mask and generates the masking data having multiple levels by masking the plurality of bottleneck data by using outputs of the plurality of upscaling circuits.

9. The edge detecting device of claim 8, wherein the edge generating circuit includes a plurality of sequentially connected decoder circuits to decode the plurality of bottleneck data, wherein one of the plurality of decoder circuits concatenate one of the plurality of bottleneck data and a decoding data being output from another of the plurality of decoder circuits, and wherein a last decoder circuit of the plurality of decoder circuits outputs the edge map.

10. The edge detecting device of claim 9, wherein one of the plurality of decoder circuits includes a plurality of sequentially connected convolutional neural networks, and wherein one of the plurality of convolutional neural networks outputs a decoding data.

11. The edge detecting device of claim 1, wherein the feature extracting circuit:
   generates a query feature data corresponding to a query image and provides the query feature data to the region detecting circuit, and
   generates a support feature data corresponding to a support image and provides the support feature data to the prototype generating circuit during a training operation.

12. The edge detecting device of claim 11, wherein the prototype generating circuit generates the prototype data by using the support feature data and a support label including a foreground information and a background information of the support image during the training operation.

13. The edge detecting device of claim 12, wherein a total loss function during the training operation is determined as a sum of a region detecting loss function and an edge loss function,
   wherein the prototype generating circuit divides a plurality of dimensions of the support feature data by a plurality of groups, generates a plurality of prototype data so that each prototype data includes foreground information and background information corresponding to a group of dimensions, and
   wherein the region detecting circuit generates a plurality of segmentation masks by using the plurality of prototype data and the query data to calculate the region detecting loss function.

14. The edge detecting device of claim 13, wherein the prototype generating circuit generates one prototype data so that one foreground information and one background information correspond to the support feature data, and the region detecting circuit generates one segmentation mask by using the one prototype data and the query feature data to calculate the edge loss function.

15. An edge detecting method comprising:
   generating first feature data and second feature data by encoding an input image;
   generating prototype data including foreground information of an object and background information of the object by using the first feature data and an input label;
   generating a segmentation mask by detecting a region of the object by using the first feature data and the prototype data; and
   generating an edge map by combining the segmentation mask and the second feature data.

16. The edge detecting method of claim 15, wherein generating the first feature data and the second feature data includes:
- generating the first feature data having multiple levels by sequentially encoding the input image; and
- generating the second feature data having multiple levels by operating the input image and the first feature data having multiple levels.

17. The edge detecting method of claim 16, wherein generating the edge map includes:
- generating multi-level masking data by masking the second feature data having multiple levels with the segmentation mask or with data generated by upscaling the segmentation mask; and
- generating the edge map by decoding the multi-level masking data sequentially.

18. The edge detecting method of claim 17, wherein generating the edge map includes a plurality of decoding steps, wherein one of the plurality of decoding step includes:
- generating concatenation data by concatenating a level of the multi-level masking data with decoding data output from another decoding step; and
- generating the decoding data by performing a neural network operation on the concatenation data.

19. The edge detecting method of claim 15, wherein generating the prototype data includes:
- generating a masking data by masking the first feature data with the input label; and
- generating a foreground prototype data corresponding to the foreground information and a background prototype data corresponding to the background information from the masking data.

20. The edge detecting method of claim 19, wherein generating the segmentation mask includes:
- generating the segmentation mask by measuring a distance between a pixel of the first feature data and the foreground prototype data and a distance between a pixel of the first feature data and the background prototype data.

* * * * *